United States Patent [19]

Greiner et al.

[11] 4,440,106
[45] Apr. 3, 1984

[54] MAGNETIC ORIENTATION SYSTEM

[75] Inventors: Joachim Greiner, Ebenhausen; Eberhard Gärtner, Munich, both of Fed. Rep. of Germany

[73] Assignee: Agfa-Gevaert Aktiengesellschaft, Leverkusen, Fed. Rep. of Germany

[21] Appl. No.: 386,400

[22] Filed: Jun. 8, 1982

[30] Foreign Application Priority Data

Jun. 15, 1981 [DE]  Fed. Rep. of Germany ....... 3123746

[51] Int. Cl.$^3$ ............................................. H01F 13/00
[52] U.S. Cl. ..................................... 118/640; 118/623; 427/48; 427/130; 264/108; 335/306
[58] Field of Search .......................... 427/48, 130, 47; 118/640; 264/108; 335/306

[56] References Cited

U.S. PATENT DOCUMENTS 2,711,359  6/1955  Von Behren .......................... 162/60
2,796,359  6/1957  Speed .................................... 427/48
4,177,442  12/1979  Bate et al. ............................ 427/48

Primary Examiner—John D. Smith
Assistant Examiner—K. E. Jaconetty
Attorney, Agent, or Firm—Connolly and Hutz

[57] ABSTRACT

A two-part arrangement of permanent magnets with low retentivity conducting elements for the flow of magnetic force is used in order to orientate magnetically anisotropic pigments in a suspension in the direction of tape travel during the production of a magnetic tape by means of magnetic fields. The first part of the arrangement acts on the suspension with an inhomogeneous strong magnetic field of about 5000 A/cm which is narrowly restricted physically, without anticipating the orientation in the direction of tape travel. Orientation in the direction of tape travel takes place in the second part of the arrangement which has a physically extended but weaker field.

8 Claims, 7 Drawing Figures

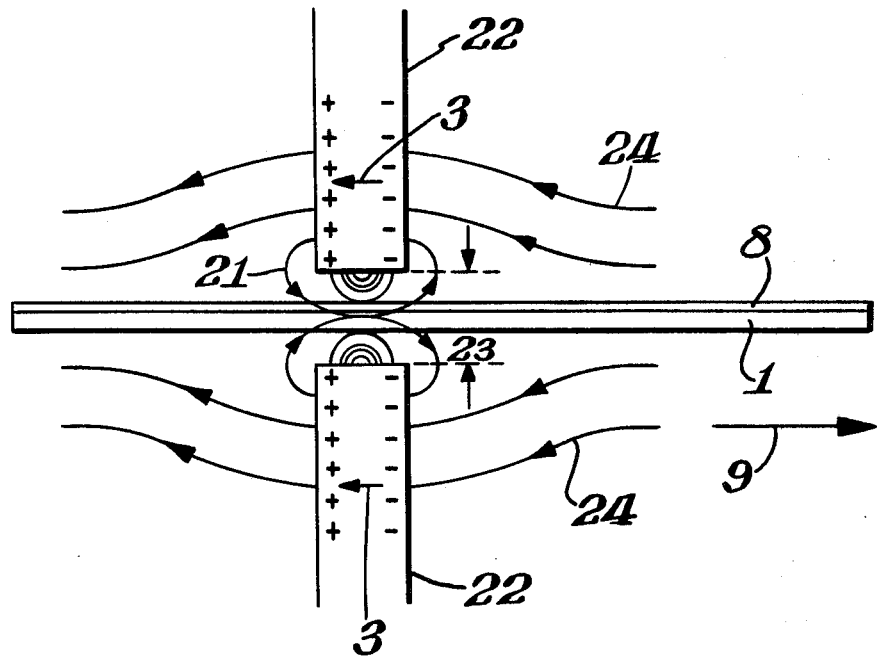
_Fig. 6._
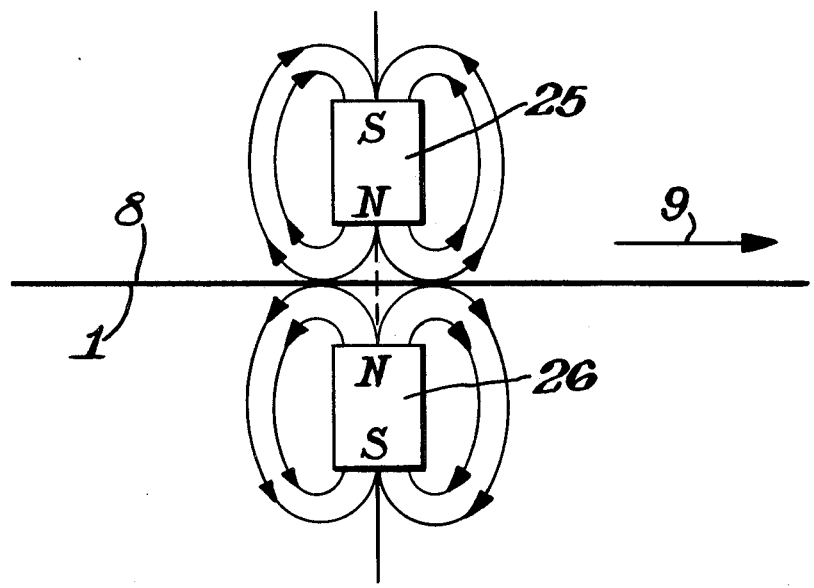
_Fig. 7._

MAGNETIC ORIENTATION SYSTEM

The invention relates to a system which orientates highly coercive magnetic particles during the production of magnetic store layers.

The method of producing magnetic store layers is known and is explained with reference to FIG. 1. A non-magnetic film 1 composed, for example, of polyethylene terephthalate is guided from a supply spool 12 via guiding elements 13 to a winding spool 14. The magnetic suspension 8 is applied to the film 1 by the casting device 15. The coated film, still in the liquid state, passes through the orientation system 17 and then through a drying device 18. The suspension consists of a binder-containing lacquer with solvent and magnetic particles such as iron oxides, $CrO_2$ or metal powder. The solvent evaporates in the drying device so that the magnetic layer 11 is formed from the magnetic suspension. Nowadays, the particles of the suspension almost exclusively have a pronounced magnetic primary axis which depends on the anisotropy of the shape and/or the anisotropy of the crystals. Elongate particles are preferably used. The orientation system generates a primary axis of magnetisation in the direction of tape travel.

A magnetising coil through which the cast film is guided can be used as orientation system as described in French Pat. No. 100 8218 and in the Journal Hochfrequenztechnik und Elektroakustik, April 1963, Vol 72, Edition 2, pages 54–63. Such a coil has the advantage of an extensive homogeneous field in the direction of tape travel, which can be adapted to the conditions predetermined by the suspension by altering the coil current. The main disadvantages of using a coil is that it has to be operated in a highly explosive atmosphere. This disadvantage has meant that it is preferable nowadays to use orientation systems made up of permanent magnets.

The simplest forms of permanent magnets, horseshoe magnets and bar magnets, for the orientation of magnetic pigment particles are described in U.S. Pat. No. 2,796,359.

A frequently used and long known system (U.S. Pat. No. 2,711,901) makes use of magnetic strips which oppose each other with like poles. The film with the suspension cast on it is guided along the line of symmetry. The magnetic field acting on a pigment particle alters the bearing by 180° during the passage of the particle. Owing to this field configuration, a good orientation is achieved only if the maximum value of the directional field is substantially larger than the coercive field of the pigment particles. FIG. 2 of the Patent specification shows the configuration of the longitudinal component of the directional field acting on the particles. The resultant transverse field is zero. With such a orientation system composed of barium ferrite magnets, it is possible to generate maximum field intensities of approximately 800 A/cm. This is sufficient for the orientation of pigments having coercive fields between 100 and 400 A/cm. With metal pigments having coercive field intensities of approximately 800 A/cm, the orientation is unsatisfactory with such a system.

German Offenlegungsschrift No. 24 44 971 describes a directional arrangement which allows several such systems to act in succession. A perpendicular field component, which the control magnet should possess, should thus be corrected. This is preferably achieved by building up the consecutive pairs of geometrically different control magnet strips of like polarity.

The split field of a magnetic circuit has also been proposed for generating a magnetic primary direction in magnetic store layers (British Pat. No. 902,838). An important detail in this Patent specification is the fact that, owing to the action of the split field of the magnetic circuit on the moving magnetisable particles, these particles should be rotated by the split field in the primary direction in which the magnetisation of the signal to be recorded is to lie. It is immaterial whether the split field is generated by a current or by permanent magnets. Details about the strength of the split field are not given.

The split field of a magnetic circuit is also used for other purposes in the production of magnetic tape. For example, it is used for distributing the suspension uniformly over the cast web (German Offenlegungsschrift No. 23 46 390) or to draw out the swollen elevations at the edges (German Offenglegungsschrift No. 29 36 035). Both applications make use of the force of attraction, not the torque, of the magnetic field toward the pigment particles, which is unimportant in the directional process. It is explicitly stated in the last paragraph on page 4 of German Offenlegungsschrift No. 23 46 390, that orientation is not the object. In German Offenlegungsschrift No. 29 36 035, the pigment is held by the split field and pressed outwards by the movement of the film. On the other hand, the torque exerted by the field is important in the directing process. Bate and Dunn describe, in the IEEE Trans. on Magnetics Vol Mag 16 (1980) pages 1124–25, orientation systems in which two magnetic circuits with their split scatter fields are combined. With this arrangement, the magnetic field is substantially weakened by low-retentivity conducting elements, in the fading portion of the control magnet system possessing a direction opposed to that of the main field. FIG. 4 of the articles shows a double circuit system of this type. The cast film passes through the two magnetic circuits along the line of symmetry. The low-retentivity conducting elements serve to weaken the fading field. The field configuration of the longitudinal component on the plane of symmetry is also shown in FIG. 4 of the same article. In order to evaluate the quality of orientation of the pigment particles, the following characteristic values are adopted industrially: velour effect, the ratio of residual magnetism to saturation in the longitudinal direction of the tape $M_R/M_S$ and the ratio of the residual magnetisation in the longitudinal and transverse direction $M_R///M_R\angle$.

The velour effect is due to the fact that it is not always possible to orientate the pigment particles in the direction of tape travel and parallel to the surface of the layer. The magnetic primary axis is at an inclination to this direction in this case. Owing to the oblique position of the primary axis, different residual magnetisation is achieved by the recording field with its approximately circular configuration of field lines, depending in which direction the magnetic layer passes through the recording field. This is due to the fact that the angle between the field direction on the play-back edge and the primary axis for the two directions of tape travel is different. This results in a different level of the velour effect for opposing recording directions particularly when scanning short wave lengths (approximately 5 μm). The velour effect is characterised by the logarithm of the ratio of the two levels:

$$V(dB) = 20 \log (P1/P2)$$

With a wave length of 4 μm, a value of V=2 dB implies that the velour effect is strong. The values $M_R/M_S$ and $M_{R//}/M_{R\perp}$ are used as a gauge of the scatter of the primary axes of the particles round the direction of tape travel. In order to determine $M_R/M_S$, the residual magnetisation $M_R$ and the saturation magnetisation $M_S$ are measured in the direction of the primary axis. The ratio $M_R/M_s$ indicates the value of the anisotropy. The closer the ratio is to the value 1, the better the particles are orientated. As absolute saturation is never achieved completely, it is necessary to indicate the field modulation when comparing various samples. The $M_R/M_S$ value has the disadvantage that nowadays it varies practically only between 0.7 and 0.96. It must be measured very accurately in order to indicate differences. In order to determine $M_{R//}/M_{R\perp}$ (orientation ratio) the residual magnetisation $M_{R//}$ is measured in the direction of the primary axis and the residual magnetisation $M_{R\perp}$ in the direction lying perpendicular thereto in the plane of the layer. This value has the advantage that the apparatus required for measuring it is less expensive than that required for determining $M_R/M_S$. The saturation residual magnetisation is virtually never achieved in the perpendicular direction owing to the high demagnetisation factor of transversely magnetised elongate particles. $M_{R//}/M_{R\perp}$ is even more dependent on the modulation field intensity than $M_R/M_S$. The former orientation systems have a number of defects which are found to be disturbing, particularly nowadays, in the production of store materials with coercive fields exceeding 500 A/cm. Powdered metal pigments having coercive fields exceeding 800 A/cm are being brought onto the market at present. These values will increase significantly in future (1600–4000 A/cm). As the total coercive field $H_C$ represents only a mean value of the coercive fields of the particles, higher fields than the mean coercive field $H_C$ are required for orientating the particles. The production of such strong fields in a hazardous environment necessitates considerable production costs if current-carrying magnetising coils are to be used. When using permanent magnets, it is very difficult to generate the strong fields needed for the orientation of highly coercive pigments. The object of the invention is therefore to provide a directional system with which highly coercive store material having a high quality of anisotropy in the direction of tape travel can be produced.

The object has been achieved according to the invention by magnet system for the orientation of the magnetic primary axes of pigment particles of a magnetic, binder-containing dispersion, which is applied to a substrate by casting machines, comprising permanent magnets and low-retentivity elements for conducting the magnetic flux, the orientation system comprising two partial systems wherein the field of the first directional system has an intensity between 1600 and 16,000 A/cm and is concentrated over a maximum cross-section of 5×5 mm², and wherein the field lines have a markedly curved configuration and a strong field gradient, and the field produces, as the film lies near the slit, a main direction of the magnetising vectors of the particles which is orientated obliquely to the direction of tape travel, and the field of the following second partial system has an intensity between 400 and 2400 A/cm and a dimension in the longitudinal direction of at least 0.5 cm and essentially a longitudinal component which is orientated parallel to the direction of film travel, and the magnets which are at a distance from the film are arranged in mirror image fashion to the direction of film travel.

The pigment particles are magnetised by the first field in such a way that their magnetising vectors do not deviate by more than 90° from the principal direction. Such a condition corresponds to the remanent condition of a previously saturated material. According to the invention, the main direction of magnetisation does not lie parallel to the surface of the layer nor parallel to the direction of tape travel owing to the type of directional field, but has a component in the direction of film travel. Moreover, the magnetising vectors of these particles may be focussed in the principal direction by rotation of the particles. To achieve these conditions, it is necessary, according to the invention, for the maximum magnetic field of the first orientation system to be at least twice as large as the coercive field of the pigment particles.

The second part of this orientation system has the object, according to the invention, of converting the magnetisation vectors of the beam into a position parallel to the direction of tape travel by mechanical rotation of the particles. This is achieved by the magnetic field which acts in this second part of this orientation system and has only one longitudinal component in the direction of film travel in the field region effecting the rotation. The system is made up mirror symmetrically to the tape of film.

The period for which the particles are subject to the field effect depends on the size of the field and the casting speed during the casting process. This period must be adapted to the period required to rotate the particles in the direction of film travel. This rotation period lies between 0.01 and 0.1 seconds depending on the type of pigment, type of lacquer (viscosity) and field intensity. The type of orientation is measured as a function of the film speed in order to estimate the rotation times for a specific casting solution and specific arrangement of the second part of the orientation system in accordance with one of the methods of measurement indicated above. The second part of the orientation system can be made up of parts according to the sub-claims, and the size of the field of one such part should not fall below 0.5 cm in the longitudinal direction. Furthermore, the maximum field intensity of the individual partial magnetic systems should decrease in an even manner as the distance from the casting device increases. In particular, the maximum field intensity of a partial magnet system should only amount to 20% of the maximum field intensity of the preceding system in each case.

A few magnetic systems are described by way of example below with reference to the following figures.

FIG. 6 shows a second partial system according to the invention with a magnetic plate and slit.

FIG. 7 shows a second partial system according to the invention in which two like magnetic poles face each other.

Figure 2:
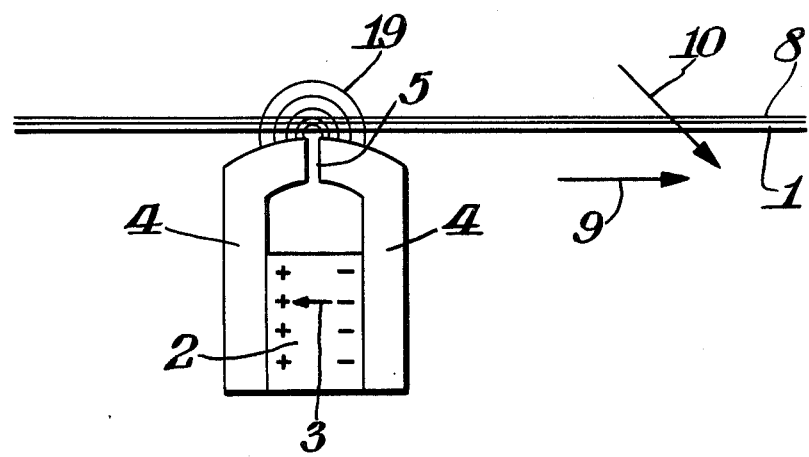
FIG. 2 shows a first partial system according to the invention with permanent magnets and magnetic yokes.

FIG. 2 shows a cross-section through an example of the first part of the orientation system for the generation of a high inhomogeneous magnetic field. According to the invention, it consists of a strip-shaped permanent magnet 2, with a magnetic primary axis 3, which is comprised of two strip-shaped magnetic yokes 4/5. These yokes are composed of a material having a saturation magnetisation exceeding 1.8 Tesla. They form a slit 5 which may be from 30 μm to 2 mm wide. Inhomogeneous fields 19 having an intensity of ~5000 A/cm are regulated across the slit. While the film 1 with the layer 8 moves in direct contact with the slit in the direction of the arrow 9, according to the invention, the slit field 19 penetrates through the film onto the suspension.

The layer thus obtains a magnetic primary axis 10 which, in the centre, lies obliquely to the direction of tape travel 9, as indicated by the arrow.

The edge of a strip-shaped transversely magnetised permanent magnet, for example, can also be used for generating the strong inhomogeneous field of the first part of the orientation system.

Figure 3:
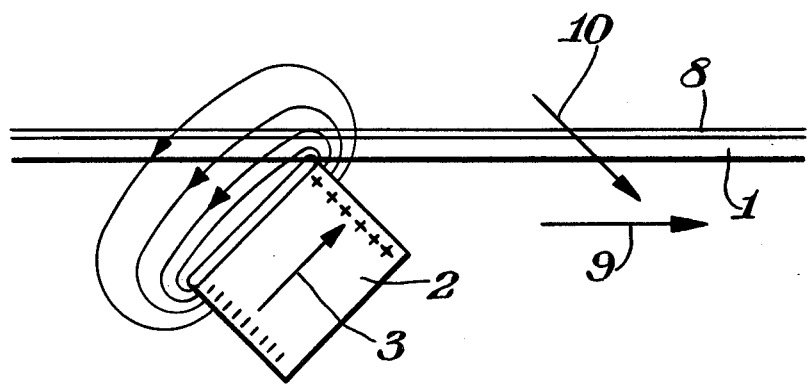
FIG. 3 shows a first partial system according to the invention consisting of a permanent magnet which is tilted toward the film direction.

The effect of such an edge is shown in FIG. 3.

Permanent magnet systems, which are known also to be inventive, are used for the second part of the orientation system, which again can be made up of one or more partial systems.

Figure 4:
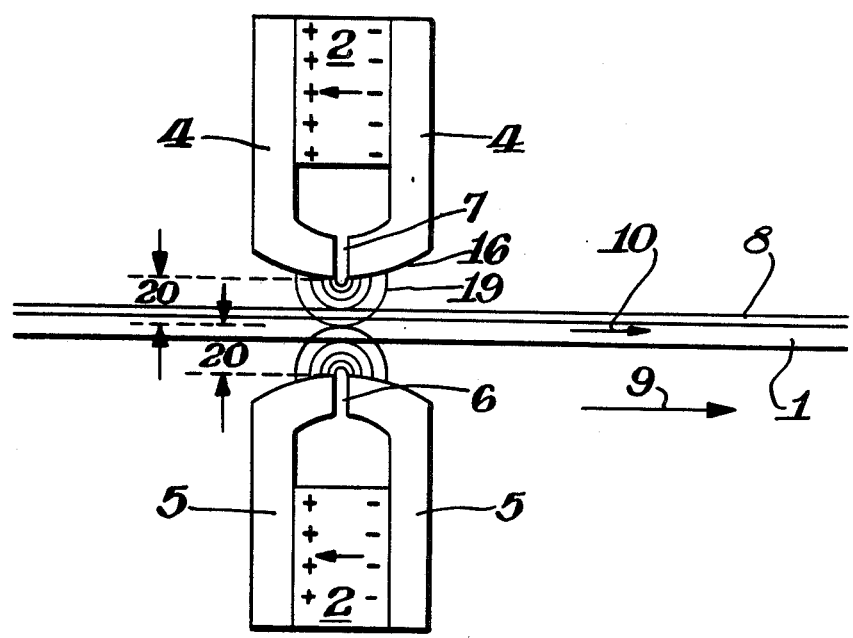
FIG. 4 shows a second partial system according to the invention consisting of two closed magnetic circuits which are arranged symmetrically to the film.
Figure 5:
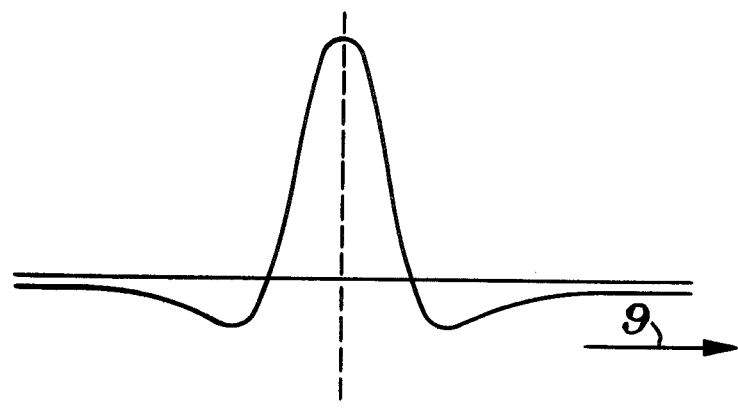
FIG. 5 shows the field configuration on the line of symmetry of the orientation system according to FIG. 4.

FIG. 4 shows one system. It consists of two magnetic circuits which are arranged symmetrically about the coated film (1,8) and the scatter fields 19 of which act in the same direction. An individual circuit is made up fundamentally like the first part of the orientation system (FIG. 2). In contrast to the first part of the orientation system, the slits 6/7 in the second part of the orientation system are at a certain distance 20 from the film and the cast suspension. The distance 20 should be at least 3 mm. This distance produces a maximum longitudinal field of at least 800 A/cm in the centre of the arrangement. The necessary size of the field 19 of 2–3 cm in length is obtained by the curved surface 16 of the low retentivity yokes 4/5. Barium ferrites or rare earth magnets, for example, can be used as permanent magnetic materials. FIG. 5 shows the field configuration on the ordinate and abscissa of the longitudinal components over the line of symmetry of such a magnetic system running parallel to the plane of the film along the abscissa. The longitudinal component has a marked peak in the centre of the system. Small subsidiary peaks of opposing direction are located to the right and left of this peak. The direction of the main peak of the longitudinal component of the second part of the orientation system coincides with the field direction over the line of symmetry of the slit in the first part of the orientation system. The direction of the magnetic field of the second system is identical to the direction of the first field beyond the center of each slit. The values of the subsidiary peaks are substantially lower than the value of the main peak, so they can be neglected.

Another arrangement according to the invention for the second part of the orientation system is shown in FIG. 6. A permanent magnetic plate 22 is transversely magnetised in direction 3. It is connected of magnetically anisotropic material with a high crystal anisotropy, allowing magnetisation perpendicularly to the surface. These surfaces then bear the magnetic charge with positive and negative poles. The plate has a slit 23 of approximately 6 mm through the centre of which the film 1 with the layer 6 travels. The configuration of the longitudinal components is qualitatively the same as in FIG. 5. The field lines 21 belong to the region which yields the main peak of the longitudinal component, while the field lines 24 show the formation of the subsidiary peaks in the opposite direction.

According to the invention, the systems shown in FIGS. 4 and 6 can also follow each other repeatedly to produce the second partial system, the field direction in the main peak remaining unchanged.

The system shown in FIG. 7 in which two like poles face each other can also be used as the second part of the orientation system. It has on its line of symmetry parallel to the plane of the film two extreme values of the longitudinal component which are equal in value with opposite polarity values. The advantage of this system lies in the fact that the field is pressed out of the intermediate space by the like poles facing each other and an extended field region is thus produced along the film. The second partial system can also be made up of several individual systems with opposing like poles when producing the second partial system by the arrangement of the like poles facing each other.

EXEMPLARY EMBODIMENT

Figure 1:
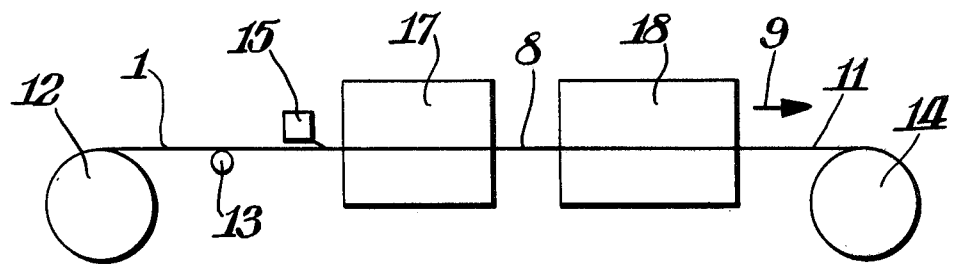
FIG. 1 shows a schematic representation of the production of magnetic tape.

An industrial casting machine of the type shown in principle in FIG. 1 was used for experimental investigations into the invention. The film speed was approximately 15 m/minute in all tests. A slit caster containing no magnetic elements was used as an applicator system 15 for the suspension 8 so that no external magnetic forces could act on the particles before the suspension entered the magnetic orientation system 17.

The individual systems mentioned in the following list were available for the orientation system consisting of two parts. The corresponding numbers serve for identification in the following statements. Either barium ferrite of the 300K type or the Co-Sm alloy Secolite made by Thyssen-Edelstahlweke Dortmund was used as permanent magnet material. Low retentivity Fe alloys were used as magnetic flux conducting material. The characteristic data of the individual systems are given below.

Individual system 1 (single circuit system)

This individual system is used exclusively for the first part of the total system. It is shown in cross-section in FIG. 2. The cross-section of the permanent magnet 2 was 3×24 mm and was magnetised over the short edge. The external dimensions of the yokes 4/5 were 14×40 mm².

Two individual magnetic systems of this type with various slit widths 5 were used.

1.1 Slit width 0.8 mm
1.2 Slit width 0.4 mm

The following individual systems (2 and 3) are used exclusively for the second part of the total system. They are all made up in mirror image fashion to the film and layer travel so that only one longitudinal component of the directional field acts therein whereas the transverse components balance each other.

Individual system 2 (two circuit system)

The two circuit system is shown in principle in FIG. 4. Ferrite rods having a cross-section of 12×19 mm², which were magnetised over the short axis, were used as permanent magnets. The total width of the yokes was 24 mm. The slit width was 0.8 mm. Two systems with differing field intensities were available.

| Designation | Total height of the permanent magnet (mm) | Maximum field intensity A/cm |
|---|---|---|
| 2.1 | 76 | 1 655 |
| 2.2 | 38 | 920 |

The field configuration shown in FIG. 5, with a strong field peak in the centre and the two weak subsidiary peaks of opposing field direction at the edge, is characteristic of this system.

Individual system 3 (opposing like poles)

Consisting of magnetic strips 25, 26 which are arranged in mirror image fashion and face each other with like poles. This system is shown in principle in FIG. 7. Two arrangements which differ substantially in their magnetic material and cross-section are tested in this case.

| Designation | Magnetic material | Cross-section width × height mm | Distance mm | Maximum field intensity A/cm |
|---|---|---|---|---|
| 3.1 | Ferrite | 25 × 40 | 8 | 920 |
| 3.2 | Co—Sm | 18 × 6 | 8 | 2,210 |

The orientation depends on the suspension used as well as the orientation system. Both the pigment and the lacquer have a decisive influence. Distance is the distance left between the two poles of the mirror image fashioned permanent magnets. The following two different suspensions were tested:

| Pigment type | Pigment material | Coercivity field A/cm | Viscosity cpi | Dispersion | Particle length μm |
|---|---|---|---|---|---|
| A | $Fe_3O_4$ | 751 | | difficult | 0.7 |
| B | Fe | 844 | 2,500 | good | 0.3 |

The quality of the orientation is described by the test values $M_R/M_S$; $M_{R///}M_{R\perp}$ described above. The field modulation for measuring the first two values was 3,200 A/cm.

The following Tables 1 and 2 each show the orientation through one of the individual systems in the top part and the results achieved with the combination according to the invention in the second part.

TABLE 1

| Orientation system | | Distance | | | |
|---|---|---|---|---|---|
| 1st part | 2nd part | mm | $M_R\|/M_S$ | $\frac{M_{R\perp}}{M_S}$ | $\frac{M_R\|}{M_{R\perp}}$ |
| Pigment type: B | | | | | |
| Individual systems | | | | | |
| without | without | | 0.665 | 0.583 | 1.255 |
| 1.1 | | 0 | 0.664 | 0.594 | 1.216 |
| | 3.1 | 8 | 0.729 | 0.535 | 1.538 |
| | 3.1 | 12 | 0.716 | 0.547 | 1.511 |
| | 3.1 | 20 | 0.707 | 0.557 | 1.364 |
| | 2.1 | 7 | 0.764 | 0.506 | 1.419 |
| | 3.2 | 8 | 0.795 | 0.480 | 1.878 |
| Combinations according to the invention | | | | | |
| 1.1 | 3.1 | 8 | 0.779 | 0.480 | 1.903 |
| 1.1 | 3.1 | 8 | 0.779 | 0.486 | 1.915 |
| 1.1 | 2.1 | 7 | 0.799 | 0.471 | 1.950 |
| 1.1 | 2.1 | 7 | 0.797 | 0.471 | 1.925 |
| 1.1 | 3.2 | 8 | 0.798 | 0.477 | 1.967 |
| 1.1 | 2.1 + 3.2 | 7 | 0.802 | 0.488 | 1.852 |

TABLE 2

| Orientation system | | Distance | |
|---|---|---|---|
| 1st Part | 2nd Part | mm | $M_R\|/M_S$ |
| Pigment type A | | | |
| Individual system | | | |
| without | without | | 0.64 |
| 1.1 | — | 0 | 0.68 |
| 1.2 | — | 0 | 0.68 |
| | 3.1 | 8 | 0.645 |
| | 2.1 | 7 | 0.70 |
| 1.1 | 3.1 | 8 | 0.72 |
| 1.2 | 3.1 | 8 | 0.715 |
| 1.2 | 2.1 | 7 | 0.73 |
| 1.2 | 2.1 + 2.2 | 7 | 0.74 |

The results in the Tables show that better orientations can be achieved with the systems according to the invention consisting of two parts than with a system according to the prior art. $M_{R///}/M_S$ and $M_{R\perp}/M_S$ values are invariably higher, resulting in better anisotropy of the pigment particles in a magnetic layer.

We claim:

1. In a magnetic system for the orientation of the magnetic primary axes of pigment particles in a magnetic, binder-containing dispersion applied to a substrate in the direction of tape travel by casting machines, comprising permanent magnets and low-retentivity elements for conducting the magnetic flux with two permanent magnets which are arranged in mirror image fashion relative to the direction of tape travel, the novel combination comprises
   two partial systems wherein the field of the first orientation system having a magnetic slit in the vicinity of the cast dispersion has an intensity between 1600 and 16,000 A/cm and is concentrated over a maximum cross-section of 5×5 mm², wherein the field lines have a markedly curved configuration and a strong field gradient, and
   means of said first system producing a main direction of the magnetization vectors of the particles which is oriented obliquely to the direction of tape travel, and the field of the following second partial system has an intensity between 400 and 2400 A/cm and a size of at least 0.5 cm in the longitudinal direction and essentially one longitudinal component which is oriented parallel to the direction of film travel, and the magnets which are arranged in mirror image fashion to the direction of tape travel are so constructed and arranged as to leave a distance of at least 3 mm between the slits and the substrate with dispersion.

2. A magnetic system according to claim 1, characterised in that the first part of the orientation system consists of a bar-shaped permanent magnet.

3. A magnetic system according to claim 1, characterised in that the second partial orientation system is made up of two or more individual systems to extend the field effect.

4. A magnetic system according to claim 3, characterised in that the field peaks of the individual systems of the second part of the orientation system decrease in an even manner as the distance from the casting device increases.

5. A magnetic system according to claim 3, characterised in that the field peak of an individual system amounts to only 20% of the field peak of the preceding individual system as the distance increases.

6. A magnetic system according to claim 1, characterised in that the low-retentivity yokes of the first and second part of the orientation system have a saturation magnetisation exceeding 1.8 Tesla.

7. A magnetic system according to claim 1, characterised in that an individual system of the second part of the orientation system comprises a transversely magnetised permanent magnetic plate which has a slit which is at least 6 mm wide through the centre of which the film is guided perpendicularly to the plate surface.

8. A magnetic system according to claim 1, characterised in that the second partial system is formed by permanent magnets whose like poles face each other.

* * * * *